(12) United States Patent
Hayashi et al.

(10) Patent No.: US 7,166,391 B2
(45) Date of Patent: Jan. 23, 2007

(54) COBALT COMPOUND FOR USE IN ALKALINE STORAGE BATTERY, METHOD FOR MANUFACTURING THE SAME, AND POSITIVE ELECTRODE PLATE OF ALKALINE STORAGE BATTERY EMPLOYING THE SAME

(75) Inventors: Kiyoshi Hayashi, Toyohashi (JP); Toshihiro Yamada, Toyohashi (JP); Nobuyasu Morishita, Toyohashi (JP); Kojiro Ito, Kosai (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 100 days.

(21) Appl. No.: 10/008,413

(22) Filed: Nov. 13, 2001

(65) Prior Publication Data

US 2002/0086208 A1    Jul. 4, 2002

(30) Foreign Application Priority Data

Nov. 15, 2000  (JP)  ............................. 2000-348442
Apr. 26, 2001  (JP)  ............................. 2001-129947

(51) Int. Cl.
*H01M 4/58* (2006.01)
(52) U.S. Cl. .................. 429/218.1; 29/623.1; 429/223
(58) Field of Classification Search ............ 429/218.1, 429/223, 224; 423/594
See application file for complete search history.

(56) References Cited

U.S. PATENT DOCUMENTS

| | | | | |
|---|---|---|---|---|
| 5,032,475 A | * | 7/1991 | Hasebe et al. | ................. 429/60 |
| 5,393,616 A | * | 2/1995 | Mori et al. | .................... 429/59 |
| 5,523,182 A | * | 6/1996 | Ovshinsky et al. | ......... 429/223 |
| 5,993,995 A | * | 11/1999 | Bernard et al. | ............. 429/223 |
| 6,103,213 A | | 8/2000 | Nakamura et al. | |
| 6,114,063 A | * | 9/2000 | Katsumoto et al. | ......... 429/223 |
| 6,183,909 B1 | * | 2/2001 | Maeda et al. | ................ 429/223 |
| 2002/0086208 A1 | | 7/2002 | Hayashi et al. | |

FOREIGN PATENT DOCUMENTS

| | | | |
|---|---|---|---|
| EP | 0 774 793 | | 5/1997 |
| EP | 0 851 516 | | 7/1998 |
| EP | 0 867 408 | | 9/1998 |
| EP | 0 886 331 | | 12/1998 |
| EP | 1 207 576 | | 5/2002 |
| JP | 50-36935 | | 4/1975 |
| JP | 60-189866 | | 9/1985 |
| JP | 61-49374 | | 3/1986 |
| JP | 61-183868 | * | 8/1986 |
| JP | 3-78965 | | 4/1991 |
| JP | 7-169466 A | | 7/1995 |
| JP | 10-21902 | | 1/1998 |
| JP | 10-106555 A | | 4/1998 |
| JP | 10-270039 A | | 10/1998 |
| JP | 10-324523 | | 12/1998 |
| JP | 2002-216752 | | 8/2002 |

* cited by examiner

*Primary Examiner*—Patrick Joseph Ryan
*Assistant Examiner*—Julian Mercado
(74) *Attorney, Agent, or Firm*—Hamre, Schumann, Mueller & Larson, P.C.

(57) ABSTRACT

To provide an alkaline storage battery, a cobalt compound obtained by mixing a cobalt hydroxide powder and a sodium hydroxide powder and applying a heat treatment to the same in an atmosphere containing oxygen, a cobalt compound obtained by adding a sodium hydroxide aqueous solution and an aqueous solution containing an oxidizing agent to a cobalt hydroxide powder, or a cobalt compound obtained by baking a cobalt hydroxide powder in an atmosphere containing oxygen is used. This provides cobalt compounds suitable for producing long-life and highly reliable alkaline storage batteries, methods for manufacturing the same, and positive electrode plates of alkaline storage batteries employing the same.

7 Claims, 5 Drawing Sheets

COBALT COMPOUND FOR USE IN ALKALINE STORAGE BATTERY, METHOD FOR MANUFACTURING THE SAME, AND POSITIVE ELECTRODE PLATE OF ALKALINE STORAGE BATTERY EMPLOYING THE SAME

BACKGROUND OF THE INVENTION

1. Field of the Invention

The present invention relates to cobalt compounds for use in alkaline storage batteries, methods for manufacturing the same, and positive electrode plates of alkaline storage batteries employing the same.

2. Related Background Art

In recent years, long-life and highly reliable secondary batteries have been desired as power sources for a variety of uses, particularly for electric cars or hybrid electric vehicles. A promising example of such a secondary battery is an alkaline storage battery containing nickel hydroxide as an active material. To increase the utilization factor of the active material at a positive electrode in the foregoing alkaline storage battery, a technique of adding cobalt to the positive electrode so as to form a conductive network has been proposed. More specifically, alkaline storage batteries utilizing positive electrode plates provided by three methods as described below have been proposed.

A first method provides a positive electrode plate utilizing a nickel hydroxide active material coated with a compound containing cobalt with a valence of more than 2, and utilizing a compound containing cobalt compound with a valence of not more than 2 (see JP10(1998)-270039A).

A second method provides a positive electrode plate by filling a porous metal support with a paste containing an active material, cobalt chloride, and water (see JP10(1998)-106555A).

A third method provides a positive electrode by utilizing a paste containing $CoF_2$ powder having an average particle size of not more than 2 μm and active material powder, the $CoF_2$ powder being 3 wt % to 15 wt % (preferably, 8 wt % to 12 wt %) with respect to the total amount of the $CoF_2$ powder and the active material powder (see JP7(1995)-169466A).

The foregoing conventional methods, however, have been incapable of meeting the recent demands for batteries, that is, the demands for batteries with a lifetime corresponding to that of automobiles.

Furthermore, the first method requires steps of forming a coating layer of a cobalt compound on a surface of the active material and oxidizing the same, which make the manufacturing process complex. This complexity of the manufacturing process has made the first method inappropriate for mass production.

The second and third methods have a drawback in that an abundance of chloride ions and fluorine ions remain in an electrolytic solution after formation of $Co(OH)_2$, which hinders the reaction of the active material, thereby decreasing the utilization factor of the same. Besides, since hydroxide ions in the electrolytic solution and anions of the cobalt compound are consumed upon the formation of $Co(OH)_2$, the $Co(OH)_2$ forming reaction is not uniform, thereby causing the concentration of the electrolytic solution to vary. Therefore, a drawback has arisen in that battery properties tend to become non-uniform. Furthermore, $Co(OH)_2$ is deposited on not only the electrode plate but also a separator, thereby impairing the properties in some cases.

SUMMARY OF THE INVENTION

Therefore, with the foregoing in mind it is an object of the present invention to provide cobalt compounds suitable for producing long-life and highly reliable alkaline storage batteries, methods for manufacturing the same, and positive electrode plates of alkaline storage batteries employing the same.

To achieve the foregoing object, a first cobalt compound of the present invention is a cobalt compound suitable for use in an alkaline storage battery, obtained by mixing a cobalt hydroxide powder and a sodium hydroxide powder, and applying a heat treatment to the same in an atmosphere containing oxygen. A second cobalt compound of the present invention is a cobalt compound suitable for use in an alkaline storage battery, obtained by adding a sodium hydroxide aqueous solution and an aqueous solution containing an oxidizing agent to a cobalt hydroxide powder. A third cobalt compound of the present invention is a cobalt compound suitable for use in an alkaline storage battery, obtained by baking a cobalt hydroxide powder in an atmosphere containing oxygen at a temperature in a range of 90° C. to 140° C. With the first, second, or third cobalt compound, it is possible to produce a long-life and highly reliable alkaline storage battery. Besides, since the foregoing first, second, and third cobalt compounds can be manufactured by easier methods as compared with the conventional methods, they can be manufactured at lower costs.

As to the second cobalt compound, the oxidizing agent may include at least one selected from hydrogen peroxide, bromine, chlorine, sodium hypochlorite, and persulfate. This ensures sufficient reaction of $Co(OH)_2$.

As to the first, second, and third cobalt compounds, the cobalt hydroxide powder may be made of a solid solution of cobalt hydroxide containing at least one element selected from nickel, zinc, iron, manganese, aluminum, calcium, magnesium, strontium, barium, lithium, sodium, yttrium, and ytterbium. This provides variations of conductivity and solubility of the cobalt compounds, and hence, makes it possible to provide a cobalt compound suitable for manufacturing an alkaline storage battery for different specific purposes.

A first method of the present invention for manufacturing a cobalt compound suitable for use in an alkaline storage battery includes mixing a cobalt hydroxide powder and a sodium hydroxide powder, and applying a heat treatment to the same in an atmosphere containing oxygen.

A second method of the present invention for manufacturing a cobalt compound suitable for use in an alkaline storage battery includes adding an aqueous solution containing an oxidizing agent and a sodium hydroxide aqueous solution to a cobalt hydroxide powder.

In the second method, the oxidizing agent may include at least one selected from hydrogen peroxide, bromine, chlorine, sodium hypochlorite, and persulfate.

A third method of the present invention for manufacturing a cobalt compound suitable for use in an alkaline storage battery includes baking a cobalt hydroxide powder in an atmosphere containing oxygen at a temperature in a range of 90° C. to 140° C.

In the first, second, and third methods, the cobalt hydroxide powder may be made of a solid solution of cobalt hydroxide containing at least one element selected from nickel, zinc, iron, manganese, aluminum, calcium, magnesium, strontium, barium, lithium, sodium, yttrium, and ytterbium.

A positive electrode plate of an alkaline storage battery of the present invention is a positive electrode plate suitable for use in an alkaline storage battery including an electrolytic solution, and includes a conductive support and an active material paste supported by the support. The active material paste contains nickel hydroxide, the first, second, or third cobalt compound, and a cobalt compound having a higher solubility in the electrolytic solution than a solubility of the first, second, or third cobalt compound.

In the positive electrode plate of an alkaline storage battery, the cobalt compound having a higher solubility in the electrolytic solution may be at least one selected from cobalt metal, cobalt hydroxide, cobalt monoxide, and cobalt sulfate. This promotes the formation of a cobalt network with high conductivity, thereby making it possible to provide a positive electrode plate suitable for producing a high-power and high-utilization-factor alkaline storage battery.

In the foregoing alkaline storage battery, the cobalt compound having a higher solubility in the electrolytic solution may includes a solid solution of cobalt hydroxide containing at least one element selected from nickel, zinc, iron, manganese, aluminum, calcium, magnesium, strontium, barium, lithium, sodium, yttrium, and ytterbium. This provides variations of conductivity and solubility of the cobalt compounds, and hence, makes it possible to provide a cobalt compound suitable for manufacturing an alkaline storage battery for different specific purposes.

DETAILED DESCRIPTION OF THE INVENTION

Figure 1:
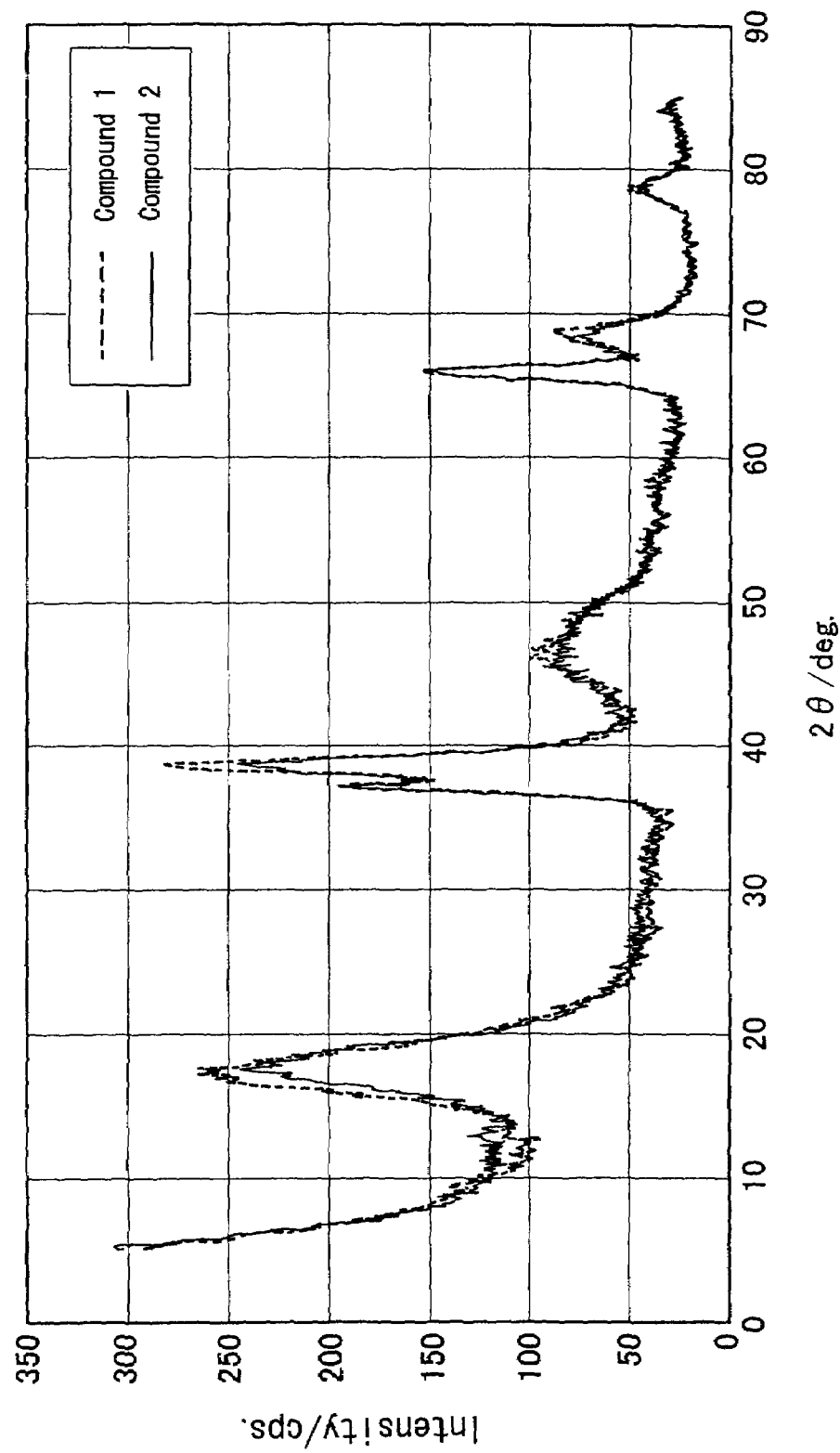
FIG. 1 is a graph illustrating examples of the results of X-ray diffraction analysis of cobalt compounds of the present invention.

The following description will depict embodiments of the present invention.

FIRST EMBODIMENT

An example of a cobalt compound and a method for manufacturing the same will be described below as a first embodiment of the present invention. The cobalt compound manufactured by the method according to the first embodiment is a cobalt compound of the present invention.

The method for manufacturing a cobalt compound according to the first embodiment includes the processes of mixing a cobalt hydroxide powder and a sodium hydroxide powder and applying a heat treatment to the same in an atmosphere containing oxygen.

Here, the cobalt hydroxide powder essentially consists of cobalt hydroxide. Specifically, for instance, a powder made of cobalt hydroxide alone, or a powder made of cobalt hydroxide forming a solid solution with metal elements, may be used as the cobalt hydroxide powder. More specifically, for instance, a powder made of cobalt hydroxide forming a solid solution with at least one metal element selected from nickel, zinc, iron, manganese, aluminum, calcium, magnesium, strontium, barium, lithium, sodium, yttrium, and ytterbium may be used. In other words, a powder made of a solid solution of cobalt hydroxide containing at least one element selected from nickel, zinc, iron, manganese, aluminum, calcium, magnesium, strontium, barium, lithium, sodium, yttrium, and ytterbium may be used. The cobalt hydroxide powder may have a mean particle diameter, for instance, in a range of 0.5 µm to 10 µm, and preferably in a range of 1.0 µm to 5.0 µm.

The sodium hydroxide powder may have a mean particle diameter, for instance, in a range of 10 µm to 1000 µm, and preferably in a range of 100 µm to 500 µm.

A quantity of the sodium hydroxide powder with respect to 100 parts by mass of the cobalt hydroxide powder may be, for instance, in a range of 100 parts to 500 parts by mass, and preferably in a range of 200 parts to 300 parts by mass.

The heat treatment in the foregoing process may be carried out, for instance, at a temperature in a range of 80° C. to 150° C. for 12 hours to 36 hours.

The use of the cobalt compound manufactured by the foregoing method according to the first embodiment (cobalt compound of the present invention) provides a long-life and highly reliable alkaline storage battery, as will be described below.

SECOND EMBODIMENT

Another example of a cobalt compound and a method for manufacturing the same according to the present invention will be described below as a second embodiment of the present invention. The cobalt compound manufactured by the method according to the second embodiment is another cobalt compound of the present invention.

The method for manufacturing a cobalt compound according to the second embodiment includes the process of adding an aqueous solution containing an oxidizing agent and a sodium hydroxide aqueous solution to a cobalt hydroxide powder.

The oxidizing agent preferably includes at least one selected from hydrogen peroxide, bromine, chlorine, sodium hypochlorite, and persulfate.

The cobalt hydroxide powder essentially consists of cobalt hydroxide. Specifically, for instance, a powder made of cobalt hydroxide alone, or a powder made of cobalt hydroxide forming a solid solution with metal elements, may be used as the cobalt hydroxide powder. More specifically, for instance, a powder made of cobalt hydroxide forming a solid solution with at least one element selected from nickel, zinc, iron, manganese, aluminum, calcium, magnesium, strontium, barium, lithium, sodium, yttrium, and ytterbium may be used. The cobalt hydroxide powder may have a mean particle diameter, for instance, in a range of 0.5 µm to 10 µm, and preferably in a range of 1.0 µm to 5.0 µm.

The use of the cobalt compound manufactured by the foregoing method according to the second embodiment (cobalt compound of the present invention) provides a long-life and highly reliable alkaline storage battery, as will be described below.

THIRD EMBODIMENT

Still another example of a cobalt compound and a method for manufacturing the same will be described below as a third embodiment of the present invention. The cobalt compound manufactured by the method according to the third embodiment is another cobalt compound of the present invention.

The method for manufacturing a cobalt compound according to the third embodiment includes the process of baking a cobalt hydroxide powder in an atmosphere containing oxygen at a temperature in a range of 90° C. to 140° C.

The cobalt hydroxide powder essentially consists of cobalt hydroxide. Specifically, for instance, a powder made of cobalt hydroxide alone, or a powder made of cobalt hydroxide forming a solid solution with metal elements, may be used as the cobalt hydroxide powder. More specifically, for instance, a powder made of cobalt hydroxide forming a solid solution with at least one element selected from nickel, zinc, iron, manganese, aluminum, calcium, magnesium, strontium, barium, lithium, sodium, yttrium, and ytterbium may be used. The cobalt hydroxide powder may have a mean particle diameter, for instance, in a range of 0.5 μm to 10 μm, and preferably in a range of 1.0 μm to 5.0 μm.

The use of the cobalt compound manufactured by the foregoing method according to the third embodiment (cobalt compound of the present invention) provides a long-life and highly reliable alkaline storage battery, as will be described below.

FOURTH EMBODIMENT

A positive electrode plate of an alkaline storage battery will be described below as a fourth embodiment of the present invention. The positive electrode plate according to the fourth embodiment is suitable for use in an alkaline storage battery including an electrolytic solution. The positive electrode plate includes a conductive support and an active material paste supported by the support. The active material paste contains nickel hydroxide, a cobalt compound of the present invention (for example, a cobalt compound according to any one of the first, second and third embodiments), and a cobalt compound having a solubility in the electrolytic solution higher than the solubility of the cobalt compound of the present invention. Hereinafter the cobalt compound having a higher solubility also is referred to as "easily-soluble cobalt compound".

The positive electrode plate according to the fourth embodiment may contain the cobalt compound of the present invention in an amount of, for instance, 5 parts to 20 parts by mass, or preferably, 5 parts to 10 parts by mass, with respect to 100 parts by mass of nickel hydroxide. Further, it contains the easily-soluble cobalt compound in an amount of, for instance, 5 parts to 20 parts by mass, or preferably, 5 parts to 10 parts by mass, with respect to 100 parts by mass of nickel hydroxide.

The cobalt compounds of the present invention have low solubilities with respect to the electrolytic solution. For instance, the cobalt compounds of the present invention have solubilities of not more than 1 μg/g in a potassium hydroxide aqueous solution with a specific gravity of 1.3. On the other hand, the easily-soluble cobalt compounds may have solubilities in a range of 100 μg/g to 10000 μg/g in a potassium hydroxide aqueous solution with a specific gravity of 1.3.

As the conductive support, a perforated metal or a porous charge collector can be used. More specifically, a porous nickel foam may be used.

The foregoing active material paste contains nickel hydroxide as an active material, and further, another additive as required.

As the foregoing easily-soluble cobalt compound, at least one selected from cobalt metal, cobalt hydroxide, cobalt monoxide, and cobalt sulfate can be used. More specifically, adaptable as the foregoing easily-soluble cobalt compound is cobalt hydroxide forming a solid solution with at least one element selected from nickel, zinc, iron, manganese, aluminum, calcium, magnesium, strontium, barium, lithium, sodium, yttrium, and ytterbium. It should be noted that, strictly speaking, cobalt metal is not a cobalt compound, but herein in the specification it is referred to as one of cobalt compounds.

As the foregoing electrolytic solution, electrolytic solutions generally used in alkaline storage batteries can be used. More specifically, an alkaline solution containing potassium hydroxide as a main solute and having a specific gravity of about 1.3 can be used.

The use of the positive electrode plate of an alkaline storage battery according to the fourth embodiment provides a long-life and highly reliable alkaline storage battery, as will be described below.

FIFTH EMBODIMENT

An alkaline storage battery will be described below as a fifth embodiment of the present invention.

An alkaline storage battery of the fifth embodiment is an alkaline storage battery including a positive electrode plate, a negative electrode plate, and an electrolytic solution. The positive electrode plate includes nickel hydroxide, a cobalt compound of the present invention (for example, a cobalt compound according to any one of the first, second, and third embodiments), and an easily-soluble cobalt compound having a solubility in the electrolytic solution higher than a solubility of the cobalt compound of the present invention. In other words, the alkaline storage battery of the present invention employs a positive electrode plate of an alkaline storage battery according to the fourth embodiment of the present invention.

Examples of the alkaline storage batteries of the present invention include nickel metal-hydride secondary batteries, and nickel-cadmium secondary batteries.

The parts other than the positive electrode plate may be those generally used in ordinary alkaline storage batteries. As the negative electrode plate, for instance, a negative electrode plate containing a hydrogen-absorbing alloy as a principal component, or a negative electrode plate containing cadmium hydroxide as a principal component thereof, can be used. As a separator, for instance, a polypropylene non-woven fabric that has been treated so as to have hydrophilicity can be used. As the electrolytic solution, for instance, an alkaline solution containing potassium hydroxide as a main solute and having a specific gravity of about 1.3 can be used.

In the alkaline storage battery according to the fifth embodiment, the positive electrode plate contains two different cobalt compounds that have different solubilities in an electrolytic solution, respectively. One of the cobalt compounds is a cobalt compound of the present invention, which has a low solubility in the electrolytic solution, while the other cobalt compound is an easily-soluble cobalt compound having a high solubility in the electrolytic solution. In the alkaline storage battery of the present invention, the cobalt compound having a low solubility forms a tight network, while the cobalt compound having a high solubility forms a fine network. Therefore, according to the alkaline storage battery, a denser conductive network is provided in the positive electrode plate. Furthermore, in the alkaline storage battery of the present invention, since the formation of the conductive network does not rely only on the dissolution and deposition of $Co(OH)_2$, the addition of the cobalt compound having a high solubility can be reduced, thereby minimizing the consumption of the electrolytic solution, as well as minimizing the variation of the electrolytic solution. Furthermore, the use of the cobalt compound of the present invention, which has a very low solubility, allows a conductive cobalt network to be formed substantially exclusively inside the electrode plate.

Thus, according to the alkaline storage battery of the present invention, a tight conductive network can be formed, thereby enabling the output of a high power. Further, according to the alkaline storage battery of the present invention, micro-short-circuits are suppressed as compared with conventional alkaline storage batteries. Therefore, a long-life and highly reliable alkaline storage battery can be provided.

EXAMPLES

The following description will depict the present invention in more detail while referring to examples thereof.

Example 1

An example in which a cobalt compound of the present invention was produced by a method according to the present invention will be described below as Example 1.

First of all, 100 g of a cobalt hydroxide powder and 200 g of a sodium hydroxide powder were mixed quickly using a mortar. The obtained mixture was spread in a metal vat, and was placed in an autoclave with an oxygen atmosphere at 120° C. for 12 hours so that a reaction took place in the mixture. As a result of the reaction, an agglomerate of a black powder having a metallic luster was obtained.

Thereafter, the obtained agglomerate was crushed finely, and the crushed material was washed in water sufficiently till the material lost the alkalinity. Then, moisture of the crushed material was vaporized. Thus, a cobalt compound of the present invention was produced. This cobalt compound of Example 1 hereinafter also is referred to as compound 1.

Example 2

Another example in which a cobalt compound of the present invention was produced by a method according to the present inventions will be described below as Example 2.

First of all, 100 g of a cobalt hydroxide powder and 200 ml of a 40% aqueous solution of a sodium hydroxide were mixed and stirred. With continuous stirring, 10% hydrogen peroxide water was dropped little by little into the cobalt hydroxide powder.

The hydrogen peroxide water dropped thereto caused the cobalt hydroxide powder to discolor gradually. The hydrogen peroxide water was dropped in the excess of the quantity required for the reaction (approximately 200 ml), and the dropping was stopped when the reaction had been carried out sufficiently. Thereafter, an obtained reaction product was filtered and washed in water sufficiently, then dried. Thus, a cobalt compound of the present invention was produced. This cobalt compound of Example 2 hereinafter also is referred to as compound 2.

Example 3

Still another example in which a cobalt compound of the present invention was produced by a method according to the present invention will be described below as Example 3.

In Example 3, a cobalt hydroxide powder was spread in a metal vat, and was placed in a thermostat with an oxygen atmosphere, and was left (baked) at 110° C. for 24 hours. As a result of this heat treatment, a brown powder was obtained. Thus, a cobalt compound of the present invention was produced. This cobalt compound of Example 3 hereinafter also is referred to as compound 3.

Typical physical properties of the compounds 1, 2, and 3 are shown in Table 1. It should be noted that the physical properties shown in Table 1 are mere examples, and may vary with manufacturing conditions to some extent.

TABLE 1

| | Mean Particle Diameter ($\mu$m) | Specific Surface Area ($m^2/g$) | Conductivity ($\Omega cm)^{-1}$ | Solubility in Electrolytic Solution ($\mu g/g$) | Valence of Cobalt |
|---|---|---|---|---|---|
| Compound 1 | 1.8 | 18.5 | 10.0 | less than 1.0 | 3.41 |
| Compound 2 | 1.7 | 20.5 | 8.5 | less than 1.0 | 3.40 |
| Compound 3 | 1.8 | 19.0 | $1.0 \times 10^{-5}$ | less than 1.0 | 2.98 |

Figure 2:
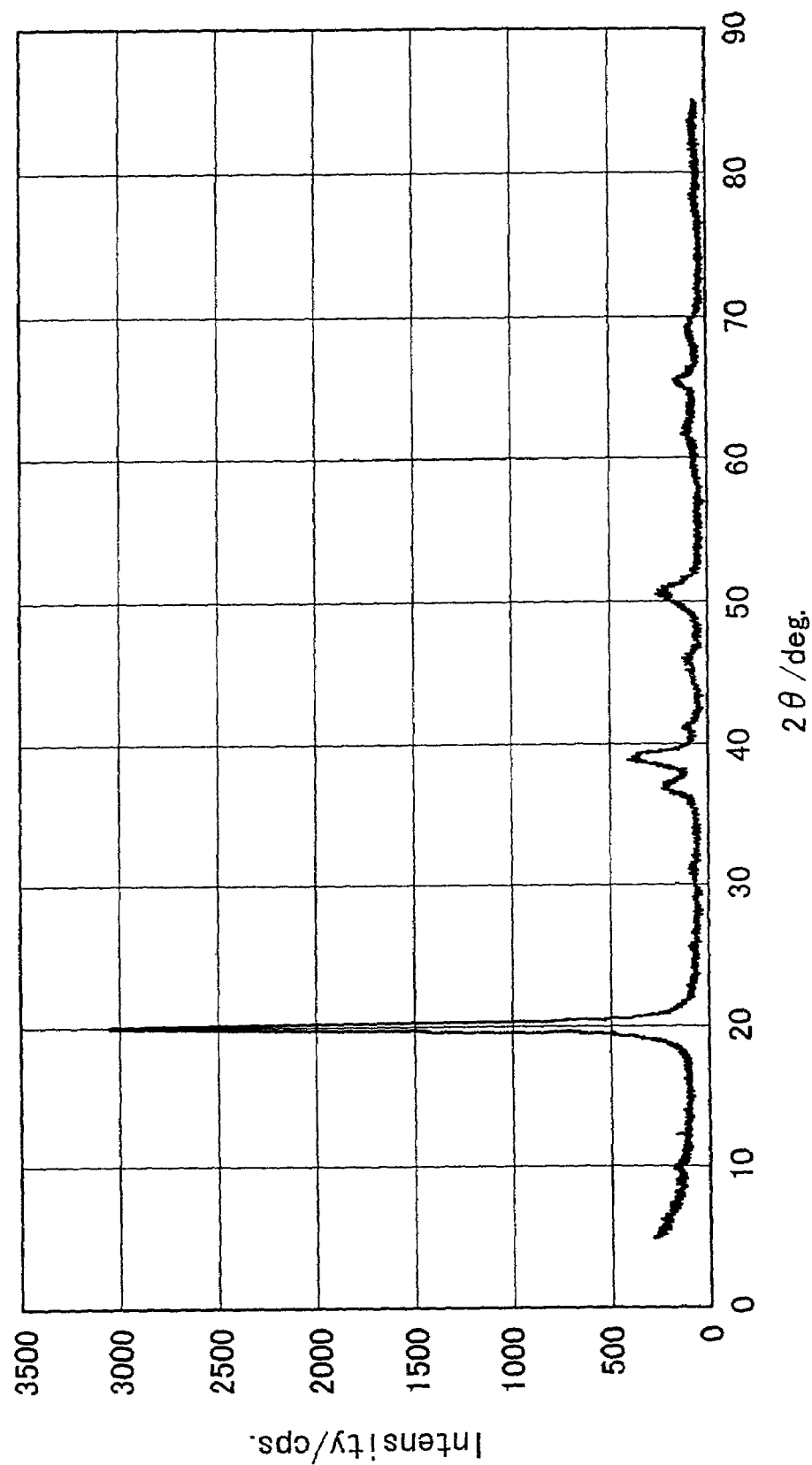
FIG. 2 is a graph illustrating another example of the results of X-ray diffraction analysis of another cobalt compound of the present invention.

The compounds 1, 2, and 3 were subjected to X-ray diffraction analysis, and the results for the compounds 1 and 2 are shown in FIG. 1, while the results for the compound 3 are shown in FIG. 2.

Example 4

An example in which a positive electrode plate of an alkaline storage battery of the present invention was produced will be described below as Example 4.

First of all, 100 parts by mass of a nickel hydroxide powder, 5 parts by mass of the compound 1, 2, or 3, and 5 parts by mass of a cobalt monoxide powder were kneaded with water added thereto, so that an active material paste was prepared. The active material paste was filled in a porous nickel foam (porosity: 95%, surface density: 450 $g/m^2$), and after drying and compressing, it was cut into a prescribed size. Thus, a positive electrode plate of the present invention was obtained. On the other hand, a positive electrode plate for comparison was produced in the same manner as above except that 5 parts by mass of a cobalt hydroxide powder was employed instead of 5 parts by mass of the powder of the compound 1, 2, or 3.

Thus, four kinds of positive electrode plates with a theoretical capacity of 1000 mAh (thickness: 0.5 mm, width: 35 mm, length: 110 mm) were produced.

Example 5

Figure 3:
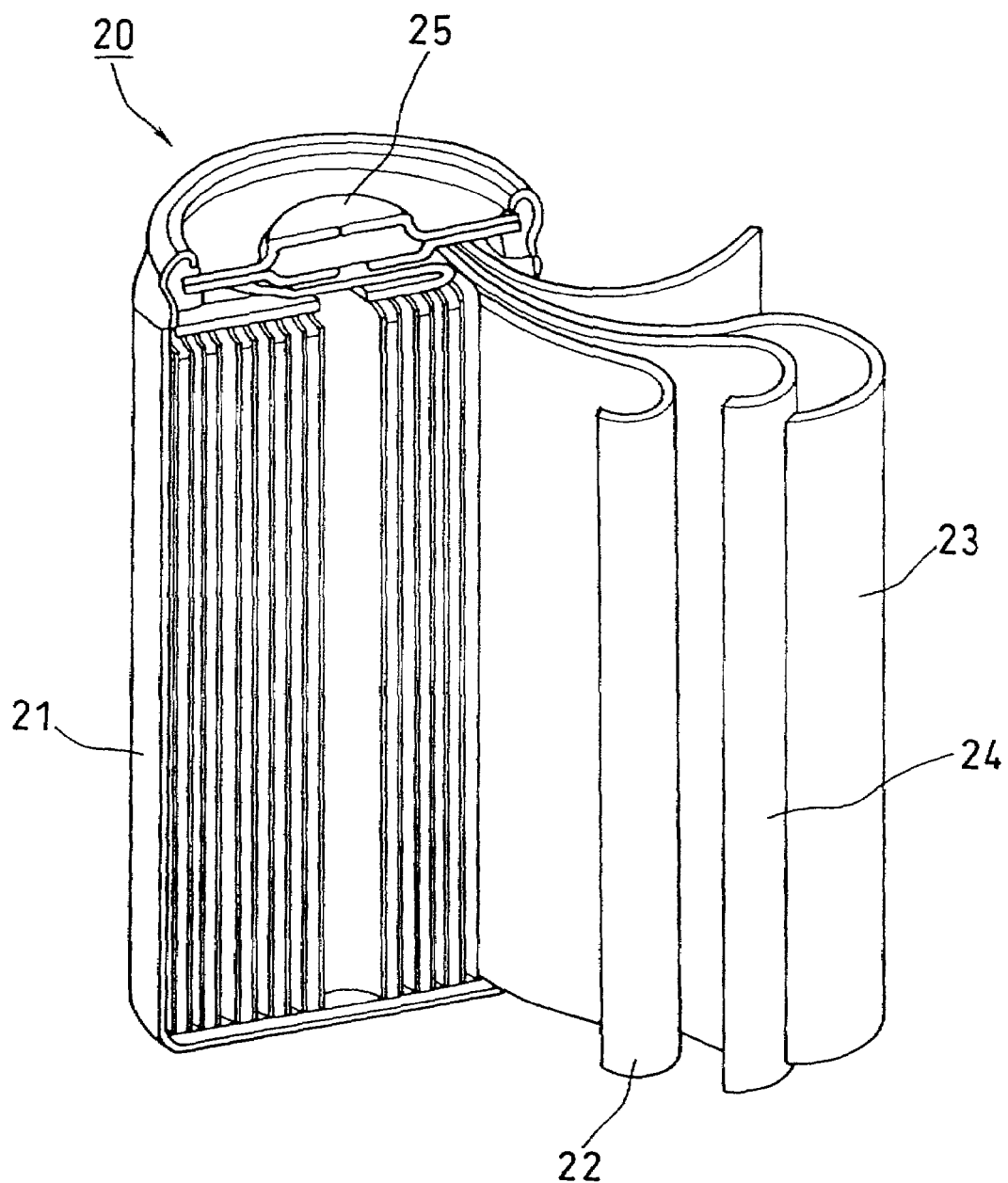
FIG. 3 is a partially exposed perspective view illustrating an example of an alkaline storage battery of the present invention.

An example in which an alkaline storage battery of the present invention was produced will be described as Example 5. A partially exposed perspective view of an AA-size nickel metal-hydride storage battery produced according to Example 5 is shown in FIG. 3.

A nickel metal-hydride storage battery 20 of Example 5 was provided with a case 21 also serving as a negative electrode terminal, a positive electrode plate 22, a negative electrode plate 23, and an electrolytic solution (not shown) and a separator 24 that were sealed in the case 21, and a sealing plate 25 equipped with a safety valve plate. The separator 24 is provided between the positive electrode plate 22 and the negative electrode plate 23.

As the positive electrode plate 22, one of the four kinds of positive electrode plates mentioned in the description of Example 4 was used. As the negative electrode plate 23, a negative electrode plate made of a hydrogen-absorbing alloy ($MmNi_{3.6}Co_{0.7}Mn_{0.4}Al_{0.3}$, Mm: misch metal) as a main component was used. As the separator 24, a sulfonated polypropylene separator was used. As the electrolytic solution, a potassium hydroxide aqueous solution having a specific gravity of 1.3 in which lithium hydroxide was dissolved to obtain a concentration of 20 grams per litter (g/l) was used.

In Example 5, first of all, the positive electrode plate 22 and the negative electrode plate 23 are provided with the separator 24 interposed therebetween, and were rolled up and disposed inside the case 21. Thereafter, 2.0 cm$^3$ of the electrolytic solution was poured in the case 21, and was sealed with the sealing plate 25. Four kinds of nickel metal-hydride storage batteries having different positive electrode plates were produced through the foregoing process. In the following description, the batteries employing the compounds 1, 2, and 3 are referred to as batteries 1, 2, and 3, respectively, and the battery employing the positive electrode plates for comparison is referred to as a comparative battery 1.

Figure 4:
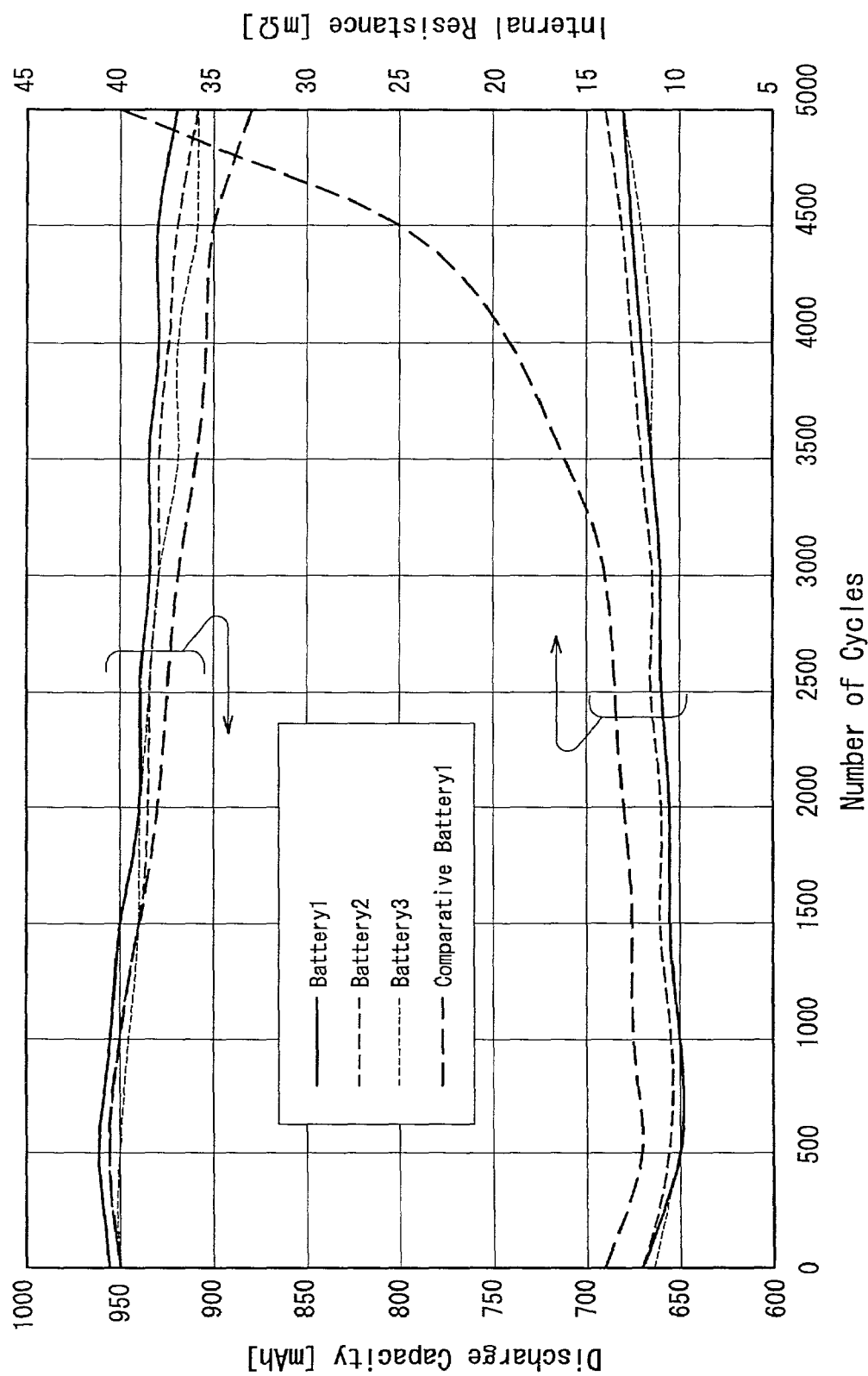
FIG. 4 is a graph illustrating examples of the results of cycle tests applied to alkaline storage batteries of the present invention.

The foregoing four kinds of batteries were subjected to a charge/discharge cycle test, and discharge capacities and internal resistances measured in the tests are shown in FIG. 4. The charge/discharge cycle test was carried out by charging/discharging the batteries with 2 A (2 C) repetitively.

As seen in FIG. 4, the batteries 1, 2, and 3 of the present invention had low internal resistances at an initial stage, and did not exhibit significant increases in the internal resistances even with the cyclical charging/discharging. The batteries 1, 2, and 3 also did not exhibit significant decreases in the discharge capacities as the cyclical charging/discharging was carried out repetitively.

Then, batteries 1, 2, and 3 and a comparative battery 1 before a cycle test, and those after subjected to a cycle test of 5000 cycles were prepared. These eight kinds of batteries were left in an environment of 65° C., and voltages thereof were measured every 48 hours. The measured results are shown in FIG. 5.

Figure 5:
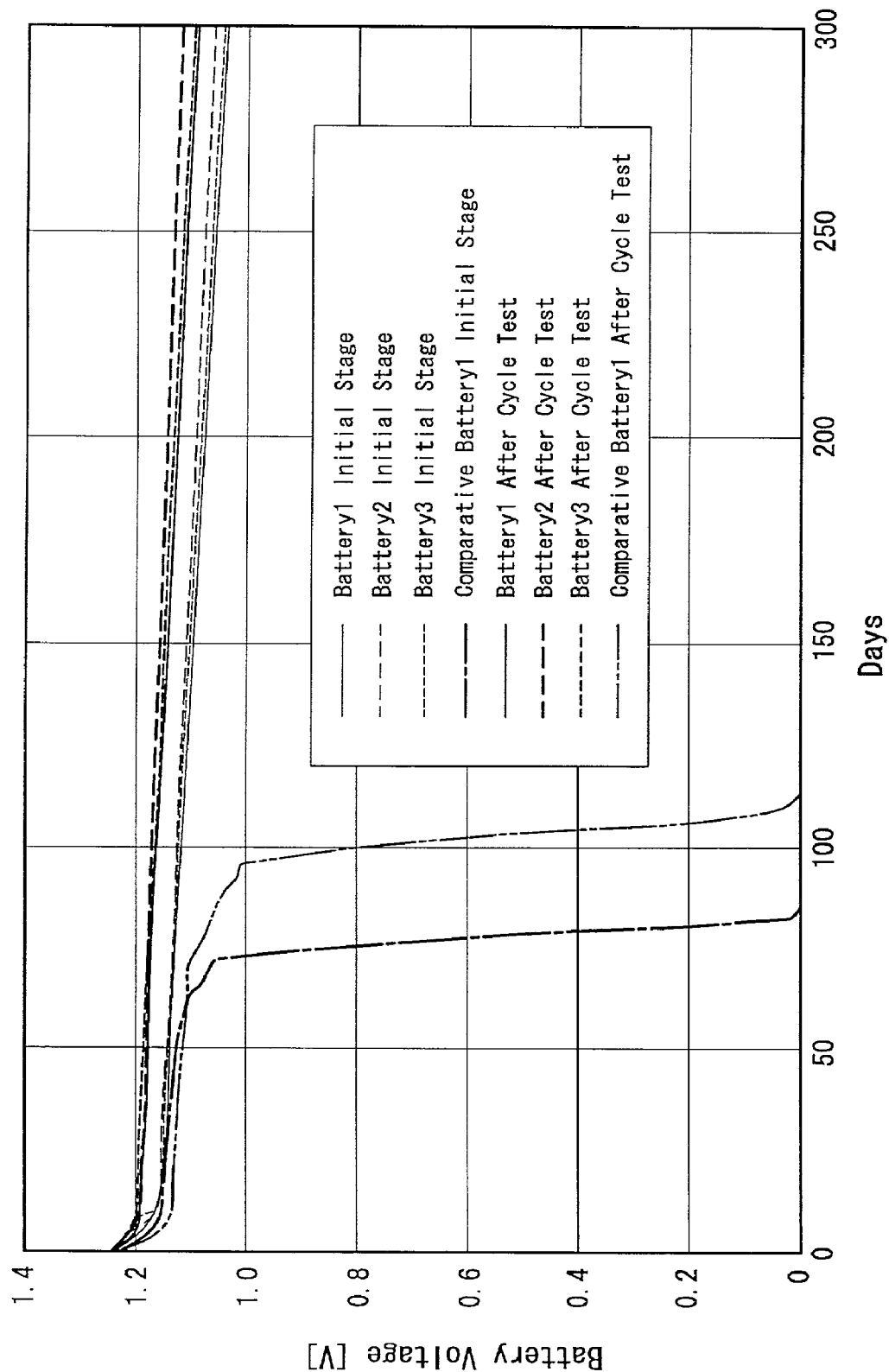
FIG. 5 is a graph illustrating examples of the results of tests in which alkaline storage batteries of the present invention were left to stand.

As illustrated in FIG. 5, the comparative battery 1 before a cycle test exhibited an abrupt decrease in the voltage, to 0 V, after 72 days. The comparative battery 1 after the cycle test exhibited an abrupt decrease in the voltage, to 0V, after 90 days. This is considered to have been caused by a phenomenon in which non-reacted cobalt hydroxide remaining in the positive electrode plate were eluted into the electrolytic solution, and conductive cobalt compounds were deposited in the separator, thereby creating short circuits between the positive electrode plate and the negative electrode plate. From the results shown in FIG. 5, it is considered that the quantity of non-reacted cobalt hydroxide remaining in the comparative battery 1 before a cycle test was greater than that in the comparative battery 1 after the cycle test.

On the other hand, the batteries 1, 2, and 3 exhibited only small decreases in the voltages both before a cycle test and after the cycle test, and maintained high battery voltages even after 90 days elapsed. After 300 days elapsed, they still maintained a battery voltage of 1 V or more.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, all changes that come within the meaning and range of equivalency of the claims are intended to be embraced therein.

What is claimed is:

1. An alkaline storage battery, comprising:
    a positive electrode plate comprising a conductive support and an active material paste supported by the support, the active material paste containing nickel hydroxide and cobalt compounds, and
    an alkaline electrolyte,
    wherein the cobalt compounds comprise a hardly-soluble cobalt compound having a solubility of not more than 1 μg/g in a potassium hydroxide aqueous solution with a specific gravity of 1.3,
    the hardly soluble cobalt compound is obtained by at least one process selected from the group consisting of mixing a cobalt hydroxide powder and a sodium hydroxide powder, and applying a heat treatment to the same in an atmosphere containing oxygen, or, adding a sodium hydroxide aqueous solution and an aqueous solution containing an oxidizing agent to a cobalt hydroxide power, or, baking a cobalt hydroxide powder in an atmosphere containing oxygen at a temperature in the range of 90° C. to 140° C., and
    an easily-soluble cobalt compound having a solubility in a range of 100 μg/g to 10000 μg/g in the potassium hydroxide solution with a specific gravity of 1.3, and
    the easily-soluble cobalt compound is at least one selected from cobalt metal, cobalt hydroxide, cobalt monoxide, and cobalt sulfate.

2. The alkaline storage battery according to claim 1, wherein said hardly-soluble cobalt compound is obtained by mixing a cobalt hydroxide powder and a sodium hydroxide powder, and applying a heat treatment to the same in an atmosphere containing oxygen.

3. The alkaline storage battery according to claim 1, wherein said hardly-soluble cobalt compound is obtained by adding a sodium hydroxide aqueous solution and an aqueous solution containing an oxidizing agent to a cobalt hydroxide powder.

4. The alkaline storage battery according to claim 3, wherein the oxidizing agent comprises at least one selected from the group consisting of hydrogen peroxide, bromine, chlorine, sodium hypochlorite, and persulfate.

5. The alkaline storage battery according to claim 1, wherein said hardly-soluble cobalt compound is obtained by baking a cobalt hydroxide powder in an atmosphere containing oxygen at a temperature in the range of 90° C. to 140° C.

6. The alkaline storage battery according to claim 2, wherein the cobalt hydroxide powder is made of a solid solution of cobalt hydroxide containing at least one element selected from nickel, zinc, iron, manganese, aluminum, calcium, magnesium, strontium, barium, lithium, sodium, yttrium, and ytterbium.

7. The alkaline storage battery according to claim 3, wherein the cobalt hydroxide powder is made of a solid solution of cobalt hydroxide containing at least one element selected from nickel, zinc, iron, manganese, aluminum, calcium, magnesium, strontium, barium, lithium, sodium, yttrium, and ytterbium.

* * * * *